Figure 1:
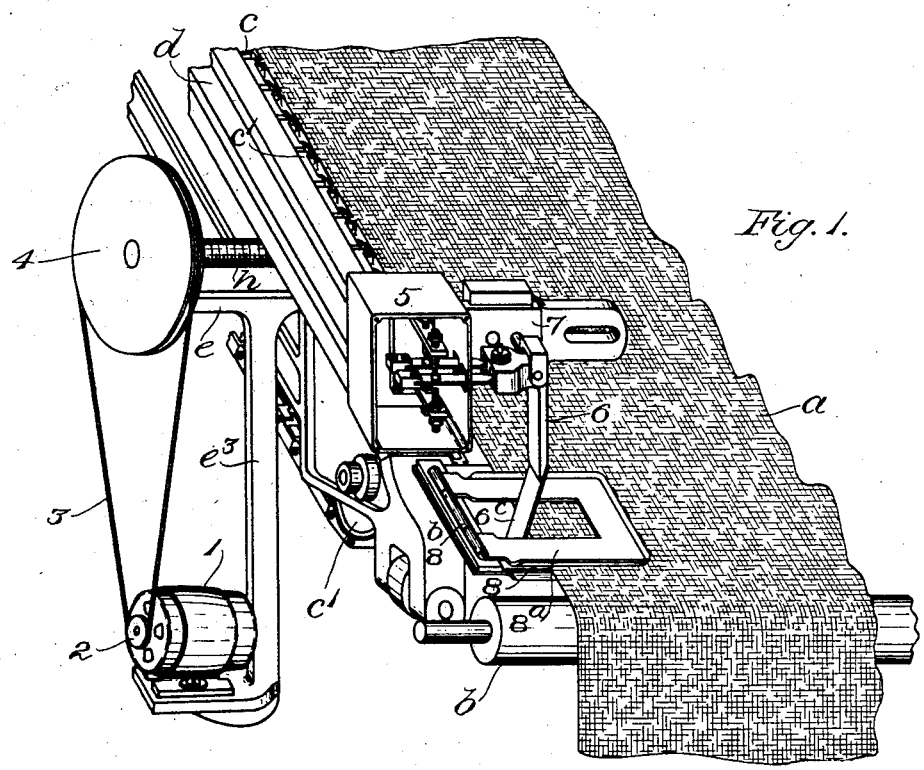

L. H. A. SCHWARTZ.
AUTOMATIC WEB HANDLING APPARATUS.
APPLICATION FILED JULY 2, 1915.

1,163,565.

Patented Dec. 7, 1915.
4 SHEETS—SHEET 1.

Witness
Oscar F. Hill

Inventor
L. H. A. Schwartz
by Chas. F. Randall
Attorney

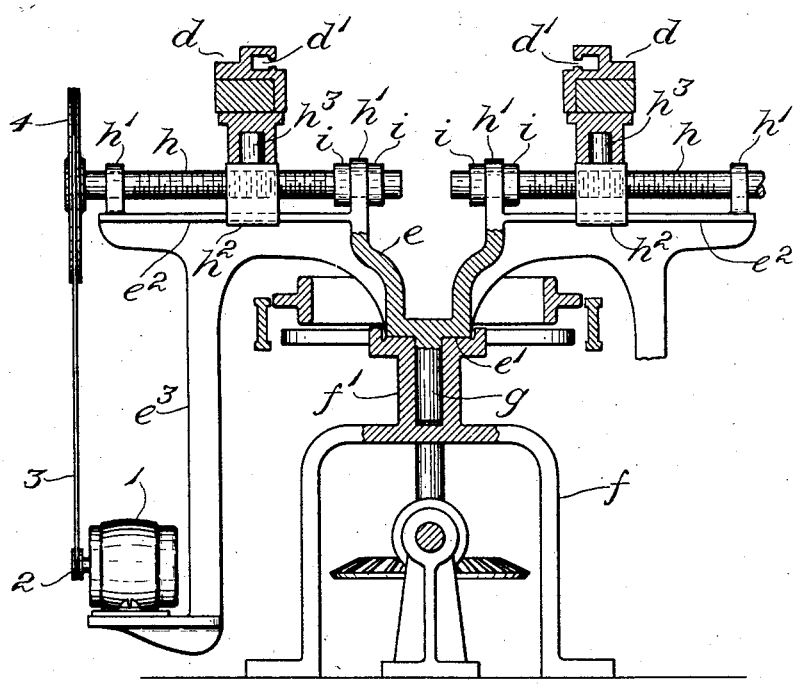

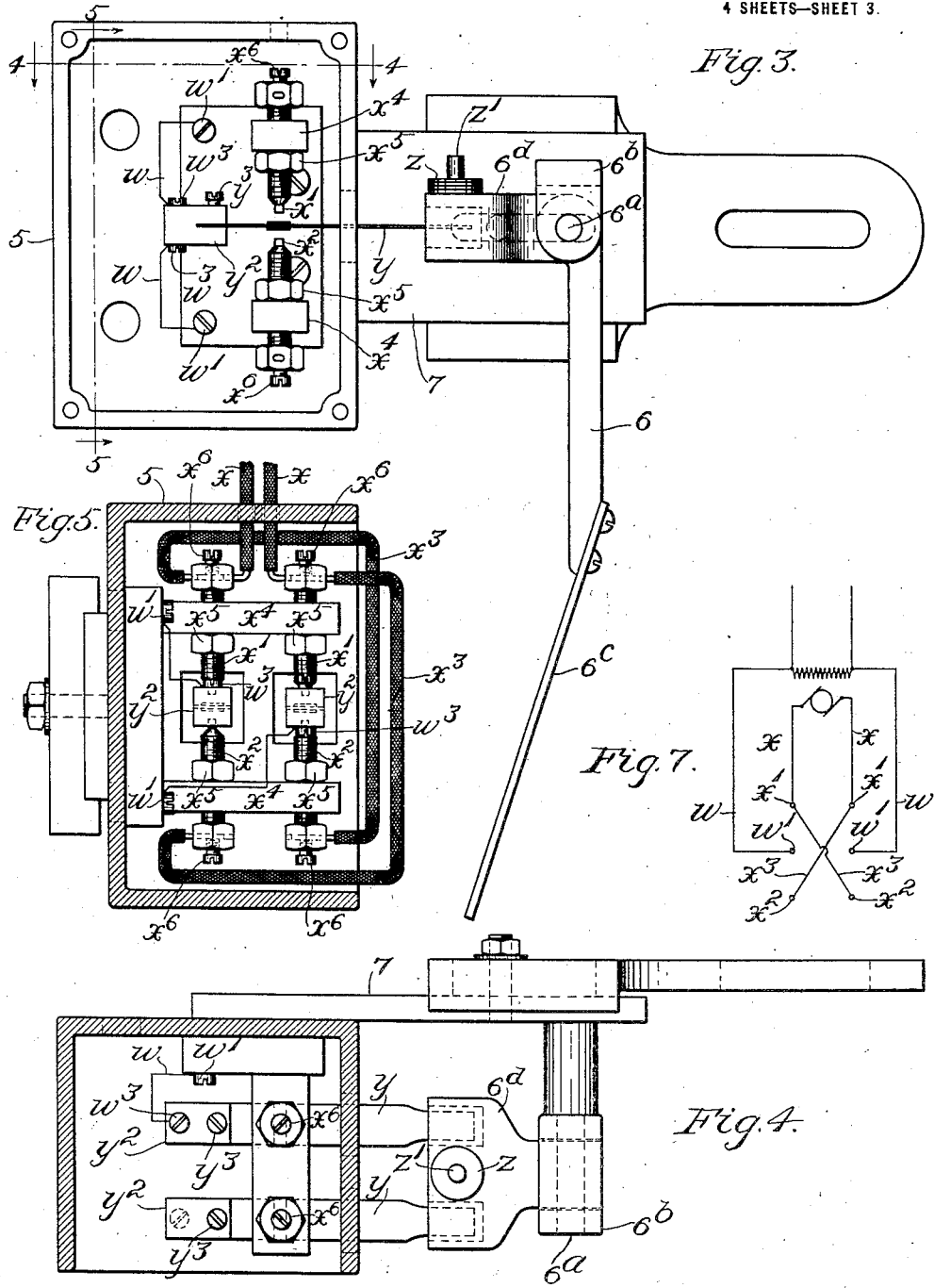

L. H. A. SCHWARTZ.
AUTOMATIC WEB HANDLING APPARATUS.
APPLICATION FILED JULY 2, 1915.

1,163,565.

Patented Dec. 7, 1915.
4 SHEETS—SHEET 4.

Witness
Oscar F. Hill

Inventor
L. H. A. Schwartz
by Chas. F. Randall
Attorney

UNITED STATES PATENT OFFICE.

LUDWIG H. A. SCHWARTZ, OF BROOKLINE, MASSACHUSETTS.

AUTOMATIC WEB-HANDLING APPARATUS.

1,163,565. Specification of Letters Patent. Patented Dec. 7, 1915.

Application filed July 2, 1915. Serial No. 37,689.

*To all whom it may concern:*

Be it known that I, LUDWIG H. A. SCHWARTZ, a citizen of the United States, residing at Brookline, in the county of Norfolk, State of Massachusetts, have invented a certain new and useful Improvement in Automatic Web-Handling Apparatus, of which the following is a specification, reference being had therein to the accompanying drawings.

My improvement in automatic web-handling apparatus has relation, more particularly, to automatic adjustment devices of the class which operate under the control of detector means controlled by the position, laterally, of a margin or selvage of the traveling web, in various kinds of machines in which a traveling web is operated upon or employed.

The invention provides for the employment of electro-mechanical devices for effecting the required automatic adjustments, and, stated in general terms, consists in apparatus comprising web-conducting means, reversibly motor-driven adjustment-means for said web-conducting means, detecting means controlled by the margin or selvage of the web, and switch-connections combined with said detecting means and controlling the motor-actuation and the direction of the adjustment effected thereby.

The invention in its broader aspects, is capable of general application in automatic web-guiding appliances and the like. An important place of use is in cloth-tentering machines, and I have herein shown devices containing the general principles of the invention applied to portions of a machine of such class, as an illustrative embodiment of the invention.

In the more specific phase of the invention that is represented in the drawings, the invention comprises the combination, in a tentering machine, with a chain-carrier, of electric-motor-driven adjusting means for said carrier, a reversing switch controlling the direction of motor-effected adjustment, and detecting means controlled by the margin or selvage of the web and itself automatically controlling the said reversing switch.

Figure 6:
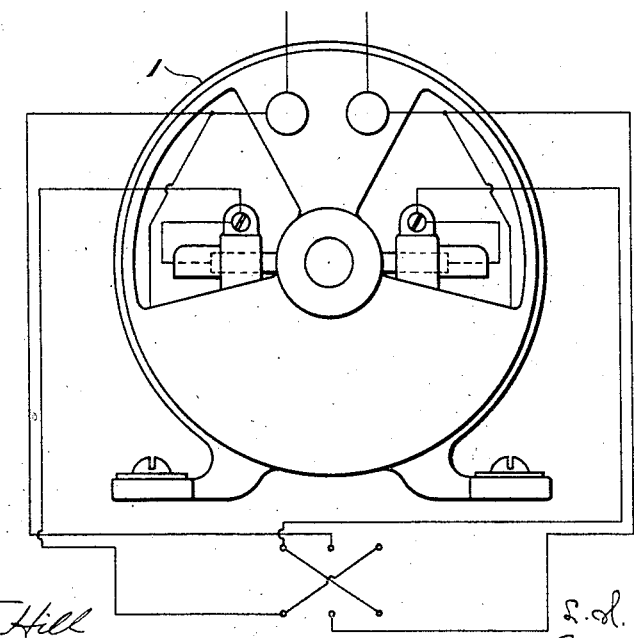
Figure 8:
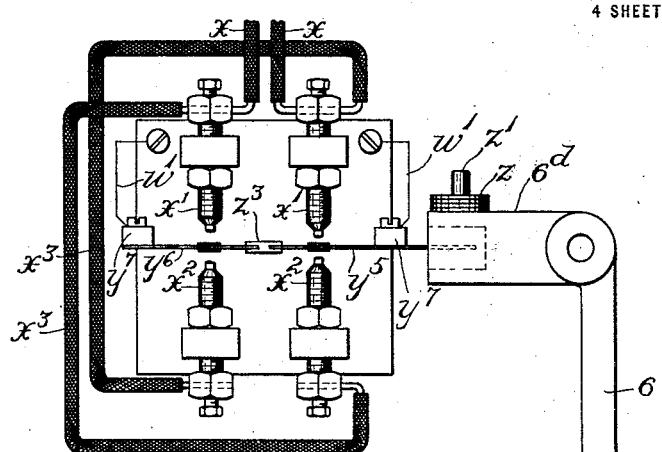
Figure 9:
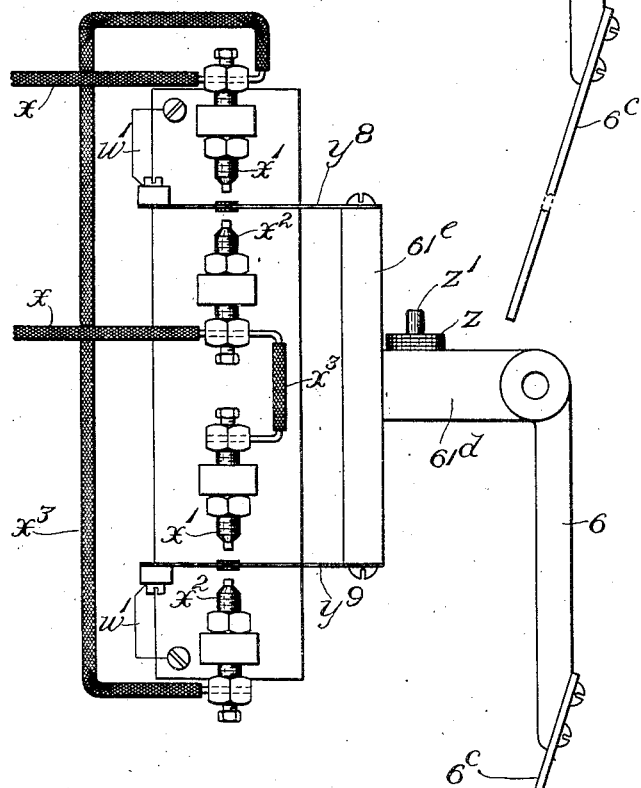

In the drawings,—Figure 1 shows certain of the parts at one side of the receiving end of a cloth-tentering machine, with said illustrative embodiment combined therewith. Fig. 2 is a view in section across the said machine, more fully representing the parts with which the electric motor is operatively related. Fig. 3 is an elevation of the feeler and reversing switch, with the cover of the switch removed. Fig. 4 is a view in horizontal section on line 4, 4, of Fig. 3. Fig. 5 is a view in vertical section on line 5, 5, of Fig. 3. Fig. 6, Sheet 1, is a diagrammatic representation of the motor and connections. Fig. 7, Sheet 3, is a wiring diagram, including the switch. Figs. 8 and 9 are views of modified switch-devices.

A portion of the width of a traveling web $a$ of cloth is shown in Fig. 1 passing upward over a guide-roll $b$, from which it is assumed to pass into and through the tentering machine. One of its margins or selvages is represented as engaged and held by the traveling chain $c$ passing around the carrier-wheel $c'$ and working in the guide-portion of the corresponding side-wing $d$. Fig. 2 shows in cross-section the opposite wings $d$, $d$, of the entering end of the machine, and the grooved guideways $d'$, $d'$, in which the chains travel in the well-known manner. In an ordinary tentering machine the wings $d$, $d$, the guide-rails of which they constitute continuations, and the carrier-wheels at front and rear of the machine, are fixedly mounted in the proper positions of adjustment. In other machines, however, designed to give a so-called elastic finish to the cloth, the wings, guide-rails, and carrier-wheels, are mounted with capacity for movement longitudinally of the machine, and the chain and chain-supports at each side of the machine are reciprocated endwise thereof oppositely with respect to those at the other side thereof. In such machines the wings, carrier-wheels, and guide-rails are mounted in connection with transversely-extending swing-frames, one of which is shown at $e$, Fig. 2, each mounted to swing around a pivotal mounting at the middle of the width of the machine. Such a pivotal mounting is shown in Fig. 2 and comprises a stand $f$ having at its top an upright bearing $f'$ receiving a pivot-pin $g$ projecting downward from the middle-portion of swing-frame $e$, the said stand having at the top of said bearing a horizontal bearing-surface on which rests a shoulder $e'$ on the bottom of the said middle-portion.

The required swinging movements of the swing-frames, and accompanying endwise movements of the guide-rails and their wings, the carrier-wheels, and the chains, are imparted in practice by mechanism not necessary to be shown. The adjustments of the rails, wings, and carrier-wheels toward and from each other are effected at will by various mechanical arrangements in practice, usually including screws. Figs. 1 and 2 show screw-arrangements comprising opposite screws $h, h$, each of which is mounted in bearings at $h', h'$, upon the swing-frame $e$ at its side of the pivotal mounting, each screw being provided with collars $i, i$, at opposite sides of one of the bearings $h'$ to hold the screw from displacement endwise. Each screw engages with a nut $h^2$ mounted upon a guideway $e^2$ upon the swing-frame and engaged by a pin $h^3$ with the adjacent wing, so that when the screw is turned the nut is shifted inward or outward upon the swing-frame, and the wing and connected carrier-wheel are adjusted correspondingly. The two wings and their carrier-wheels are made separately adjustable for the purposes of my invention.

In carrying my invention into effect, I employ electric motors in connection with the two adjusting screws $h, h$, of the wings $d, d$, and corresponding carrier-wheels, and combine such motors with the respective screws through suitable motion-transmitting connections by means of which the motors are enabled to rotate the screws and thereby adjust the wings and associated carrier-wheels in or out. The motors and motion-transmitting connections may be of any approved character and arrangement. I have herein shown only a single motor, 1, in connection with one of the screws, the motor-connections of the other screw being intended in this case to be like those actually shown, and I have represented the motion-transmitting connections as comprising a small belt-pulley 2 actuated by the rotor of the motor, a driving-belt 3, and a large pulley 4 upon the screw, the said driving-belt passing around the two pulleys and being designed to rotate the pulley 4 and screw $h$ when the rotor of the motor is rotated. The motor 1 is mounted upon the foot-portion of an arm $e^3$ extending down from swing-frame $e$, in order that the motor may accompany the screw $h$ and wing $d$ in their reciprocating movements, although this will not be necessary in all cases.

The switch by which the electric connections of the motor are controlled is contained within a switch-box 5, and the feeler through which the said switch in turn is controlled by means of the marginal portion of the web $a$ is shown at 6. The switch-box and feeler are carried by a stand 7 mounted upon the wing $d$ in convenient manner. The precise construction and arrangement of the feeler are not material so far as the broad phase of the invention is concerned. For some uses I prefer the feeler 6 here shown, which is in the form of an arm, pivoted at its upper end by means of a pin $6^a$, Figs. 3 and 4, to a small bracket $6^b$ projecting from the stand 7, the lower portion of the feeler being constituted by a flat blade $6^c$. The blade $6^c$ is the portion of the feeler which is engaged by the selvage or marginal portion of the web. It hangs alongside the path of the said selvage or marginal portion and is inclined or oblique so that it may tend to lie upon the upper surface of the marginal portion of the web, instead of touching the latter at right angles to the plane of the web, with consequently less tendency to turn the marginal portion or selvage of the web back over upon or toward the adjoining portion.

Fig. 1 shows a well-known arrangement for keeping the marginal portion of the web flat and sustaining it widthwise against the transversely directed pressure of the feeler, such arrangement comprising a supporting plate 8 fixedly mounted and over the surface of which the web travels, and a flap $8^a$ hinged at its outer end at $8^b$ and resting upon the top surface of the web immediately over the supporting plate 8. The supporting plate and flap are formed with central openings through which the blade $6^c$ of the feeler projects downward, and within which the said blade may play back and forth transversely. When the web sways outwardly it presses the pendant portion of the feeler outward, thereby operating the switch to bring about rotation of the screw in the direction to adjust the wing $d$, its carrier-wheel $c'$, and the chain $c$ so as to present the chain in position to receive properly the thus outwardly displaced selvage or margin. The feeler tends to swing inwardly, and when the web sways transversely toward the right in Fig. 1 the feeler follows, with the result that the switch is operated to bring about rotation of the screw in the reverse direction so as to shift the wing $d$, its carrier-wheel $c'$, and chain inward, and keep the chain thereby in proper relation with the margin or selvage of the web so as to continue to properly receive and engage with the said margin or selvage.

I have shown at $z$ a number of washers mounted upon a pin $z'$ carried by the horizontally projecting extension $6^d$ of the feeler to secure the required degree of over-weighting by which to insure a tendency of the feeler to swing so as to cause its blade $6^c$ to follow the margin or selvage of the web when such margin or selvage sways inwardly.

So far as the general features of the invention are concerned the invention is not restricted to the precise motor and switch arrangements that are shown herein, and by way of illustration I have indicated different constructions of switches. The motor-connections adapted in the illustrated embodiment are obvious from Fig. 6 and require no explanation. The chief essential is the employment of a so-called reversing switch. I employ by preference a single motor in connection with each of the respective screws $h$, $h$, and connections with the switch such that when the movable contacts of the switch are in electric-connection with one pair of the fixed contacts the rotor of the motor will rotate in one direction and correspondingly rotate the connected screw $h$ and adjust the wing $d$, carrier-wheel $c'$, and chain, and when the said moving contacts are in electric-connection with the other pair of fixed contacts the rotor will rotate in the other direction and reversely rotate the said screw and reversely adjust the said wing, carrier-wheel, and chain.

Referring to Fig. 7, $w'$, $w'$, indicate points with which the line wires $w$, $w$, are connected, and with which the movable contacts of the switch are permanently in electric-connection. $x'$, $x'$ are fixed contact points in the armature connections, with which the movable contacts of the switch are caused to engage electrically to bring about the rotation of the rotor of the motor in one direction, and $x^2$, $x^2$, are fixed contact points with which the said movable contacts are caused to engage electrically for the purpose of producing rotation of the rotor in the opposite direction.

In Figs. 3, 4, and 5 the moving contacts of the switch consist of two spring strips $y$, $y$, arranged side by side, and each attached by one end thereof to a horizontal extension $6^d$ from the hub-portion of the feeler, the said strips being suitably insulated from the said extension. From the binding screws at $w'$, $w'$, continuations of the line wiring $w$, $w$ are extended to and connected by binding screws $w^3$, $w^3$, to blocks $y^2$, $y^2$, which are made fast by clamping screws $y^3$, $y^3$, to the free extremities of said spring strips. Each contact spring $y$ extends between an upper fixed contact $x'$ and a lower fixed contact $x^2$. The upper and lower pairs of fixed contacts $x'$, $x'$, and $x^2$, $x^2$, are cross connected by the wires $x^3$, $x^3$, with each other and the armature as shown in Fig. 5 and in the diagram, Fig. 7. The movements of the feeler taking place as the web sways from side to side cause the spring contacts $y$, $y$, to play up and down between the upper and lower pairs of fixed contacts $x'$, $x'$, $x^2$, $x^2$. For convenience of adjustment, the fixed contacts have screw threaded stems which are screwed into threaded holes tapped in upper and lower supports $x^4$, $x^4$, so that by turning the said screws their acting ends may be brought nearer to or farther from the normal positions of the spring contacts $y$, $y$, lock-nuts $x^5$, $x^5$, being provided upon the said screw-threaded stems to prevent loss of adjustment.

In Fig. 5 the wiring $x^3$, $x^3$, is connected to the head ends of the fixed contacts by binding screws $x^6$, $x^6$.

Fig. 8 shows a construction in which in place of the two spring strips $y$, $y$, of Figs. 3, 4, and 5, disposed side by side and both attached by one end to the arm $6^d$ of the feeler, a single spring strip $y^5$ is attached to the said arm, it carrying by means of a block of insulation $z^3$ a second spring strip $y^6$. Strips $y^5$ extends between one pair $x'$ and $x^2$ of fixed contacts, while strip $y^6$ extends between the other pair $x'$ and $x^2$ of fixed contacts. The wiring $w$, $w$, is connected with the respective strips $y^5$, $y^6$, by means of binding posts $y^7$, $y^7$, carried by the said strips. The action is essentially the same as in Figs. 3, 4, 5, the difference being chiefly in respect of arrangement and mechanical construction.

In the modification shown in Fig. 9 the arm $61^d$ of the feeler is provided at its free extremity with an upright block $61^e$ carrying at its upper end a spring contact strip $y^8$ playing between upper and lower fixed contacts $x'$, $x^2$, and at its lower end a spring strip $y^9$ playing between upper and lower fixed contacts $x'$, $x^2$, the wiring being, as shown, such as to secure the same results as heretofore explained, and the difference being chiefly in respect of the construction and arrangement.

I claim as my invention:—

1. Web-handling apparatus comprising, in combination, web-conducting means, reversibly electric motor-driven means for adjusting said web-conducting means relative to the web, detecting means controlled by the margin or selvage of the web, and switch-connections combined with said detecting means and controlling the motor-actuation and the direction of the adjustment effected thereby.

2. In a tentering machine, in combination, a chain-carrier, electric-motor-driven adjusting means for said carrier, a reversing switch controlling the direction of motor-effected adjustment, and detecting means controlled by the margin or selvage of the web and itself automatically controlling the said reversing switch.

3. In a tentering machine, in combination, a chain-carrier, an electric-motor-driven adjusting screw for said carrier, a reversing switch controlling the direction of motor-effected rotation of the said screw, and detecting means controlled by the margin or selvage of the web and itself automatically controlling the said reversing switch.

4. In a tentering machine, in combination, a chain-carrier, an electric-motor-driven adjusting means for said carrier, and detecting means controlled by the margin or selvage of the web and itself automatically controlling the electro-motive actuation of the said adjusting means and the direction of the adjustment.

5. In a tentering machine, in combination, a chain-carrier, an electric-motor-driven adjusting screw for said carrier, and detecting means controlled by the margin or selvage of the web and itself automatically controlling the electro-motive actuation of the said adjusting-screw and the direction of the adjustment.

6. In an elastic-tentering machine, in combination, a chain-carrier which moves longitudinally of the machine, adjusting means for said chain-carrier, an electric-motor in actuating connection with said adjusting means and partaking of the movement longitudinally of the machine, and detecting means controlled by the margin or selvage of the web and itself automatically controlling the electro-motive actuation of the said adjusting means and the direction of the adjustment.

7. In an elastic-tentering machine, in combination, a chain-carrier which moves longitudinally of the machine, an adjusting screw for said carrier, an electric-motor in driving connection with said screw and partaking of the movement longitudinally of the machine, and detecting means controlled by the margin or selvage of the web and itself automatically controlling the electro-motive actuation of the adjusting screw and the direction of the adjustment.

In testimony whereof I affix my signature.

LUDWIG H. A. SCHWARTZ.